US012789203B2

(12) United States Patent
Stewart et al.

(10) Patent No.: US 12,789,203 B2
(45) Date of Patent: Nov. 10, 2026

(54) TIP PIECE FOR SPRAY TIP

(71) Applicant: Graco Minnesota Inc., Minneapolis, MN (US)

(72) Inventors: Samuel R. Stewart, Minneapolis, MN (US); Calvin K. Henrikson, Andover, MN (US); Robert J. Lind, Robbinsdale, MN (US); Jeffrey N. Velgersdyk, Minnetonka, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 208 days.

(21) Appl. No.: 16/949,824

(22) Filed: Nov. 16, 2020

(65) Prior Publication Data

US 2021/0170426 A1 Jun. 10, 2021

Related U.S. Application Data

(60) Provisional application No. 62/945,701, filed on Dec. 9, 2019.

(51) Int. Cl.
*B05B 1/12* (2006.01)
*B05B 1/06* (2006.01)
*B05B 1/10* (2006.01)
*B05B 9/01* (2006.01)

(52) U.S. Cl.
CPC .................. *B05B 1/12* (2013.01); *B05B 1/06* (2013.01); *B05B 1/10* (2013.01); *B05B 9/01* (2013.01)

(58) Field of Classification Search
CPC .... B05B 1/12; B05B 1/06; B05B 1/10; B05B 9/01; B05B 1/048; B05B 15/65; B05B 15/18; B05B 15/534; B05B 9/007; B05B 11/0086; B05B 11/0005
See application file for complete search history.

(56) References Cited

U.S. PATENT DOCUMENTS

| | | | | |
|---|---|---|---|---|
| 4,074,861 A * | 2/1978 | Magers | ................. | B65D 83/20 239/492 |
| 5,505,381 A | 4/1996 | Torntore | | |
| 5,749,528 A | 5/1998 | Carey et al. | | |
| 6,702,198 B2 | 3/2004 | Tam et al. | | |

(Continued)

FOREIGN PATENT DOCUMENTS

| | | |
|---|---|---|
| CN | 106714975 A | 5/2017 |
| CN | 108603319 A | 9/2018 |
| CN | 109414712 A | 3/2019 |

OTHER PUBLICATIONS

First Chinese Office Action dated Mar. 8, 2022, received for corresponding Chinese Application No. 202011424802.7, p. 19.

(Continued)

*Primary Examiner* — Steven M Cernoch
(74) *Attorney, Agent, or Firm* — Kinney & Lange, P.A.

(57) ABSTRACT

A tip piece for a sprayer includes a tip body extending between a first end and a second end. A passage extends inside the tip body from the first end to a terminal end between the first end and the second end of the tip body. A nozzle extends into the tip body from the second end of the tip body and intersects the terminal end of the passage to form an orifice. A rounded interface is formed on a perimeter of the orifice between the nozzle and the terminal end of the passage.

11 Claims, 16 Drawing Sheets

(56) References Cited

U.S. PATENT DOCUMENTS

| | | | | |
|---|---|---|---|---|
| 8,490,898 | B2 * | 7/2013 | Pirrie | B05B 5/0255 239/707 |
| 2002/0014541 | A1 | 2/2002 | Krohn et al. | |
| 2009/0230221 | A1 | 9/2009 | Ballu | |
| 2011/0186655 | A1 * | 8/2011 | Ghavami-Nasr | B05B 7/0483 239/589 |
| 2013/0303585 | A1 | 11/2013 | Dunman et al. | |
| 2019/0048502 | A1 | 2/2019 | Spill et al. | |
| 2019/0143345 | A1 * | 5/2019 | Hasday | B05B 1/08 239/101 |

OTHER PUBLICATIONS

Germany Office Action dated Feb. 23, 2022, received for corresponding German Application No. 102020132570.3, p. 8.
Second Chinese Office Action dated Nov. 23, 2022, received for corresponding Chinese Application No. 202011424802.7, p. 16.
Third Chinese Office Action dated May 20, 2023, received for corresponding Chinese Application No. 202011424802.7, p. 9.
Chinese Rejection Decision dated Sep. 7, 2023 received for corresponding Chinese Application No. 202011424802.7, p. 17.
Chinese Reexamination Notification dated Jun. 25, 2026, for corresponding Chinese Patent Application No. 202011424802.7, 15 pgs.

* cited by examiner

TIP PIECE FOR SPRAY TIP

CROSS-REFERENCE TO RELATED APPLICATION(S)

This application claims priority under 35 U.S.C. § 119 to U.S. provisional application Ser. No. 62/945,701, entitled "TIP PIECE FOR SPRAY TIP," filed Dec. 9, 2019, by Samuel R. Stewart, Calvin K. Henrikson, Robert J. Lind, and Jeffrey N. Velgersdyk; the contents of which are all incorporated by this reference.

BACKGROUND

The present disclosure relates to fluid spraying systems, and in particular, to a spray tip for fluid spraying systems.

Fluid spraying systems are commonly used in a wide variety of applications, from industrial assembly to home painting. Handheld paint sprayers can be used by a human operator, while automated sprayers are typically used in mechanized manufacturing processes. Fluid sprayed by such systems conforms to a spray pattern defined, in large part, by orifice shape and size. Different spray tips, with different orifice shapes and sizes, can be positioned in fluid spraying systems to alter the spray pattern of the fluid being sprayed by the fluid spraying system. Over time, erosion can occur around the orifices of spray tips, casing the spray pattern of the fluid being sprayed to change in an unsatisfactory manner.

SUMMARY

In one aspect of the disclosure, a tip piece for a sprayer includes a tip body extending axially between a first end and a second end. A passage extends axially inside the tip body from the first end to a terminal end between the first end and the second end of the tip body. A nozzle extends axially into the tip body from the second end of the tip body. An orifice is between the nozzle and the passage and a rounded interface is between the passage and the orifice. The rounded interface has a radius of curvature.

In another aspect of the disclosure, a tip piece for a sprayer includes a tip body extending between a first end and a second end. A passage extends inside the tip body from the first end to a terminal end between the first end and the second end of the tip body. A nozzle extends into the tip body from the second end of the tip body and intersects the terminal end of the passage to form an orifice. A rounded interface is formed on a perimeter of the orifice between the nozzle and the terminal end of the passage.

In another aspect of the disclosure, a method for forming a tip piece for a sprayer includes forming a tip body with a first end and a second end. A passage is formed into the first end of the tip body and a nozzle is formed into the second end of the tip body. The nozzle intersects the passage to form an orifice between the passage and the nozzle. A perimeter of the orifice is rounded to form a rounded interface between the passage and the nozzle.

Persons of ordinary skill in the art will recognize that other aspects and embodiments of the present invention are possible in view of the entirety of the present disclosure, including the accompanying figures.

Figure 1:
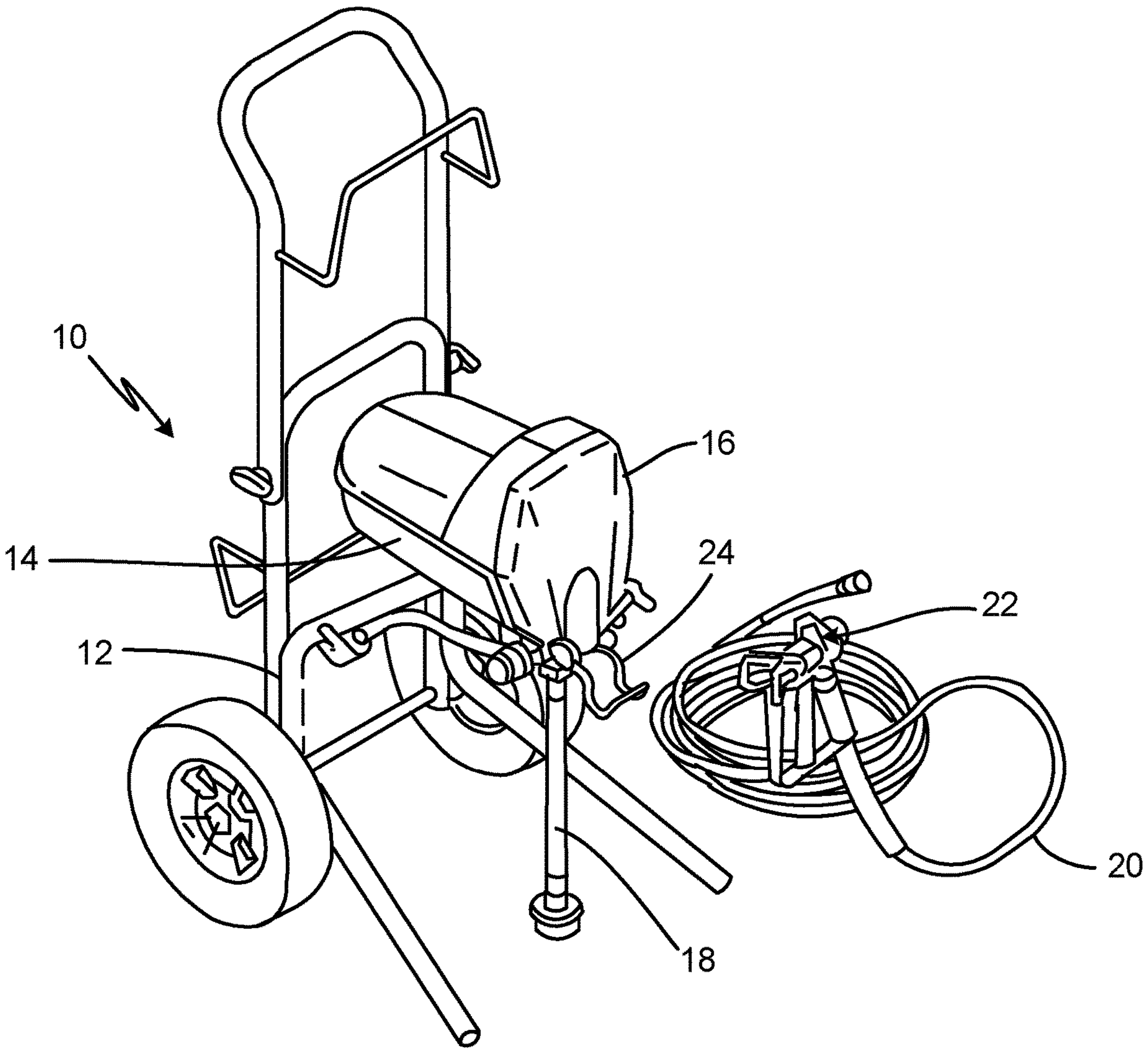
FIG. 1 is a perspective view of a cart-mounted airless sprayer system.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings. Like reference numerals identify similar structural elements.

DETAILED DESCRIPTION

FIG. 1 shows a perspective view of airless spray system 10, which includes dolly cart 12, motor 14, pump 16, suction tube 18, hose 20 and spray gun 22. Airless spray system 10 comprises a conventional airless spray system that is configured for commercial and residential use. Motor 14 and pump 16 of airless spray system 10 are designed for applying large volumes of fluid or paint during each use. Such a motor and pump are described in U.S. Pat. No. 6,752,067 to Davidson et al., which is assigned to Graco Minnesota Inc. Suction tube 18 is configured to be inserted into a five-gallon pail of fluid that can be suspended from dolly cart 12 with hook 24. Motor 14 is configured to be connected to a conventional power outlet using a power cord to provide input power to pump 16. Spray gun 22 is connected to pump 16 using hose 20, which provides ample length for an operator to roam.

Figure 2A:
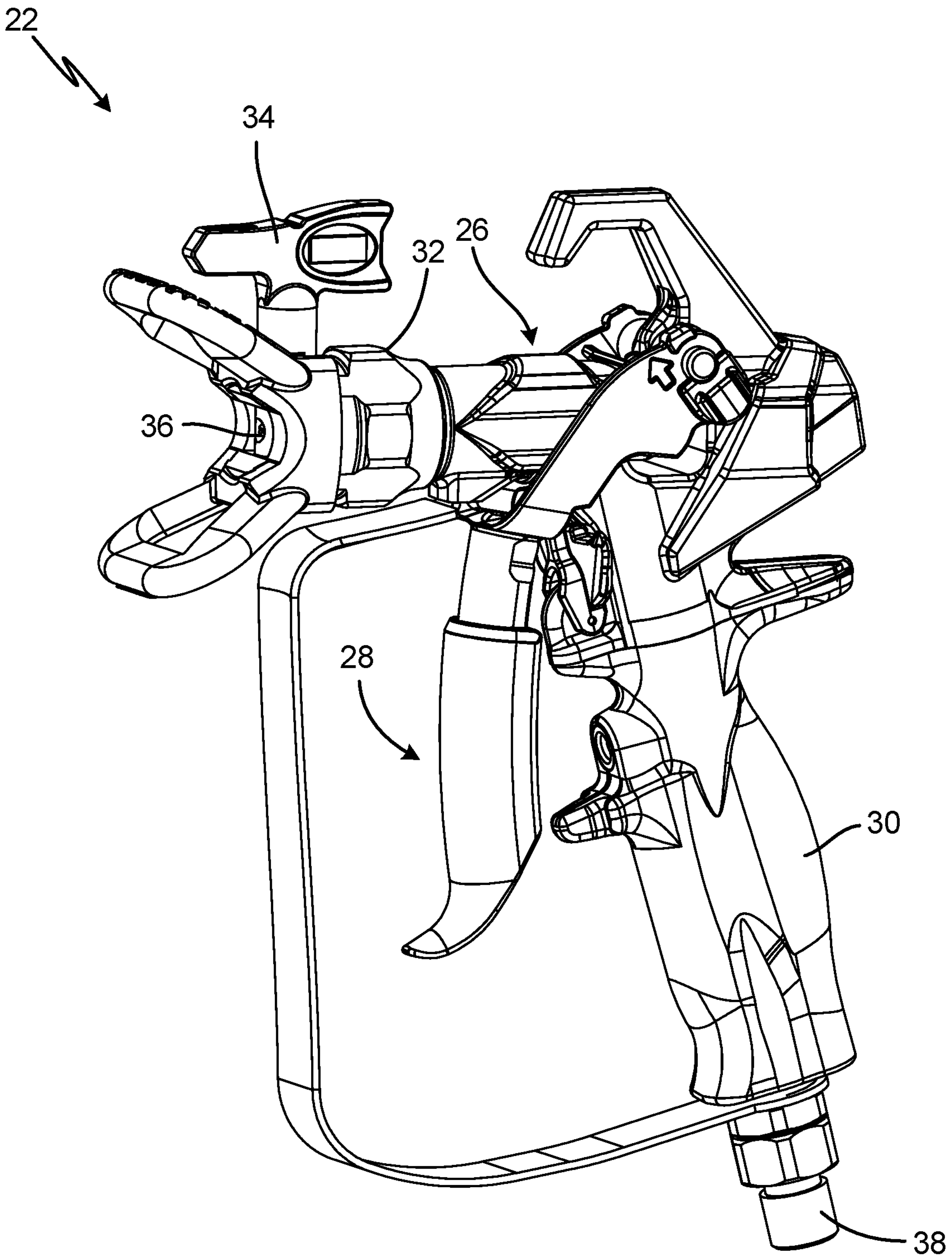
FIG. 2A is an isometric view of a spray gun.
Figure 2B:
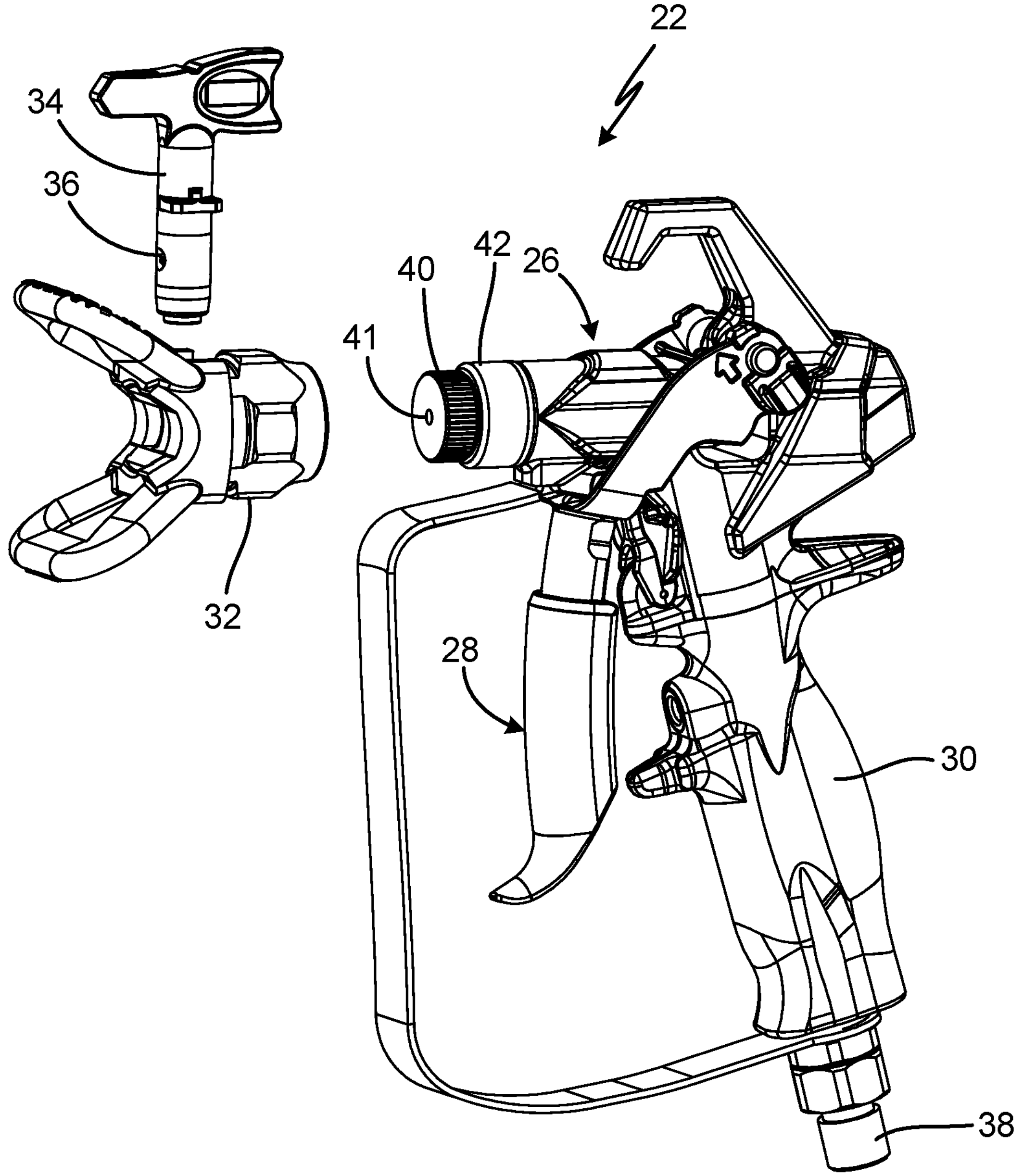
FIG. 2B is a partially exploded view of the spray gun from FIG. 2A.

FIGS. 2A and 2B will be discussed concurrently. FIG. 2A is an isometric view of spray gun 22. FIG. 2B is a partially exploded view of spray gun 22. Spray gun 22 includes gun body 26, trigger 28, handle 30, tip mount 32, tip 34, tip piece 36, connector 38, and valve 40. Gun body 26 includes mounting surface 42.

Gun body 26 is mounted on handle 30. Connector 38 is attached to a bottom of handle 30 and is configured to attach to an end of hose 20 (shown in FIG. 1) that supplies fluid to spray gun 22 under pressure. Connector 38 can be of a quick disconnect type, or any other desired type of hose connector. Handle 30 can be formed from polymer or metal. Handle 30 is configured to be gripped by one hand of a user to hold, support, and aim spray gun 22 while also allowing the user to actuate trigger 28. Gun body 26 can be formed of any suitable material for receiving various components of spray gun 22 and for providing a pathway for pressurized fluid. In some examples, gun body 26 is formed from a metal, such as aluminum.

As shown in FIG. 2B, valve 40 is disposed within gun body 26. Trigger 28 is mounted to gun body 26 and is configured to actuate a valve 40 to control spraying by spray gun 22. Valve 40 is covered by tip mount 32 when tip mount 32 is disposed on gun body 26. Fluid is output from valve 40 via outlet 41. The fluid flows through tip mount 32, to spray tip 34, and out of spray tip 34 through tip piece 36.

Tip mount 32 is attached to gun body 26 at mounting surface 42. Tip mount 32 can be removably mounted to gun body 26. For example, tip mount 32 can fit over a front end of gun body 26, and tip mount 32 can include internal threading that interfaces with external threading on mounting surface 42 on the front end of gun body 26 to fix tip mount 32 to gun body 26. Unthreading tip mount 32 from gun body 26 allows removal of tip mount 32 from gun body 26. Spray tip 34 is mounted in a bore of tip mount 32. Tip piece 36 is connected to spray tip 34. Tip piece 36 can be formed from carbide or another metal. Tip piece 36 includes a narrow outlet that is configured to atomize the fluid exiting Tip piece 36 into a spray fan. Spray tip 34 is mounted in tip mount 32 such that spray tip 34 can be rotated 180 degrees to reverse the direction of fluid flow through tip piece 36. Rotating spray tip 34 reverses the position of tip piece 36 so that fluid can flow into the outlet and out of an inlet of tip piece 36 to dislodge and flush any clogs that may develop in tip piece 36 during operation of airless sprayer system 10 (shown in FIG. 1). While tip piece 36 in the embodiment of FIGS. 2A and 2B is shown in airless spray system 10 with spray gun 22, tip piece 36 can also be included in a trigger-less auto-gun spray system as discussed further below with reference to FIGS. 6A and 6B.

Figure 3:
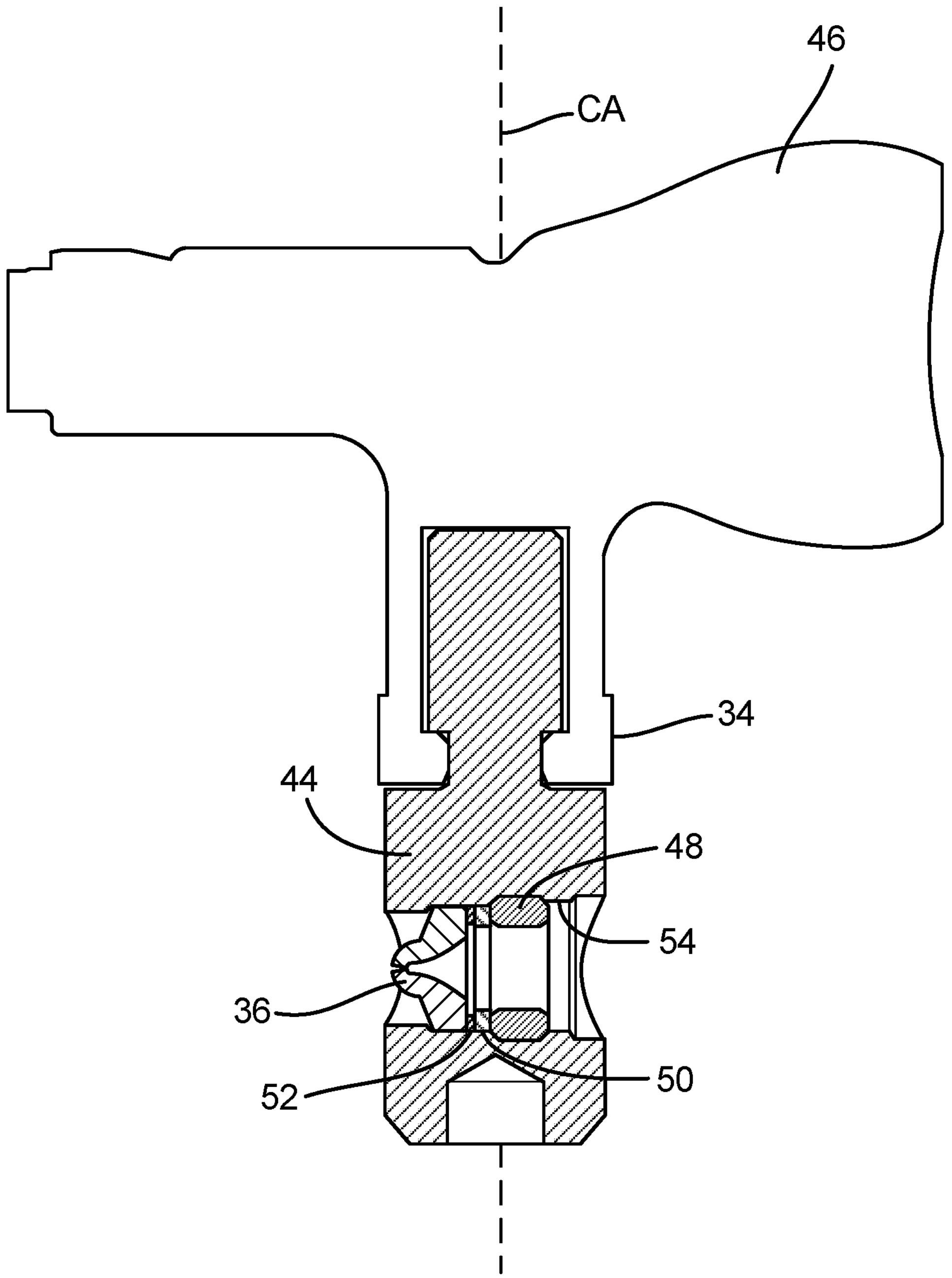
FIG. 3 is a cross-sectional view of a spray tip with a tip piece.

FIG. 3 is a cross-sectional view of spray tip 34 and tip piece 36 from the embodiment of FIGS. 2A and 2B. As shown in FIG. 3, spray tip 34 further includes cylindrical body 44, tip handle 46, threaded retainer 48, flat washer 50, and plastic washer 52. Cylindrical body 44 includes bore 54. Tip handle 46 is connected to cylindrical body 44 and allows an operator to grip and turn cylindrical body 44 on center axis CA of cylindrical body 44. Bore 54 extends transversely through cylindrical body 44 relative center axis CA. Tip piece 36 is received first into bore 54, followed by plastic washer 52 and flat washer 50. Threaded retainer 48 is inserted into bore 44 to lock tip piece 36 into position inside bore 54. Bore 54 can include internal threads that engage external threads on threaded retainer 48. In other embodiments, threaded retainer 48 can be replaced with a retaining member press-fitted into bore 54. Threaded retainer 48 is provided with a hole to allow fluid to flow through threaded retainer 48.

Figure 4A:
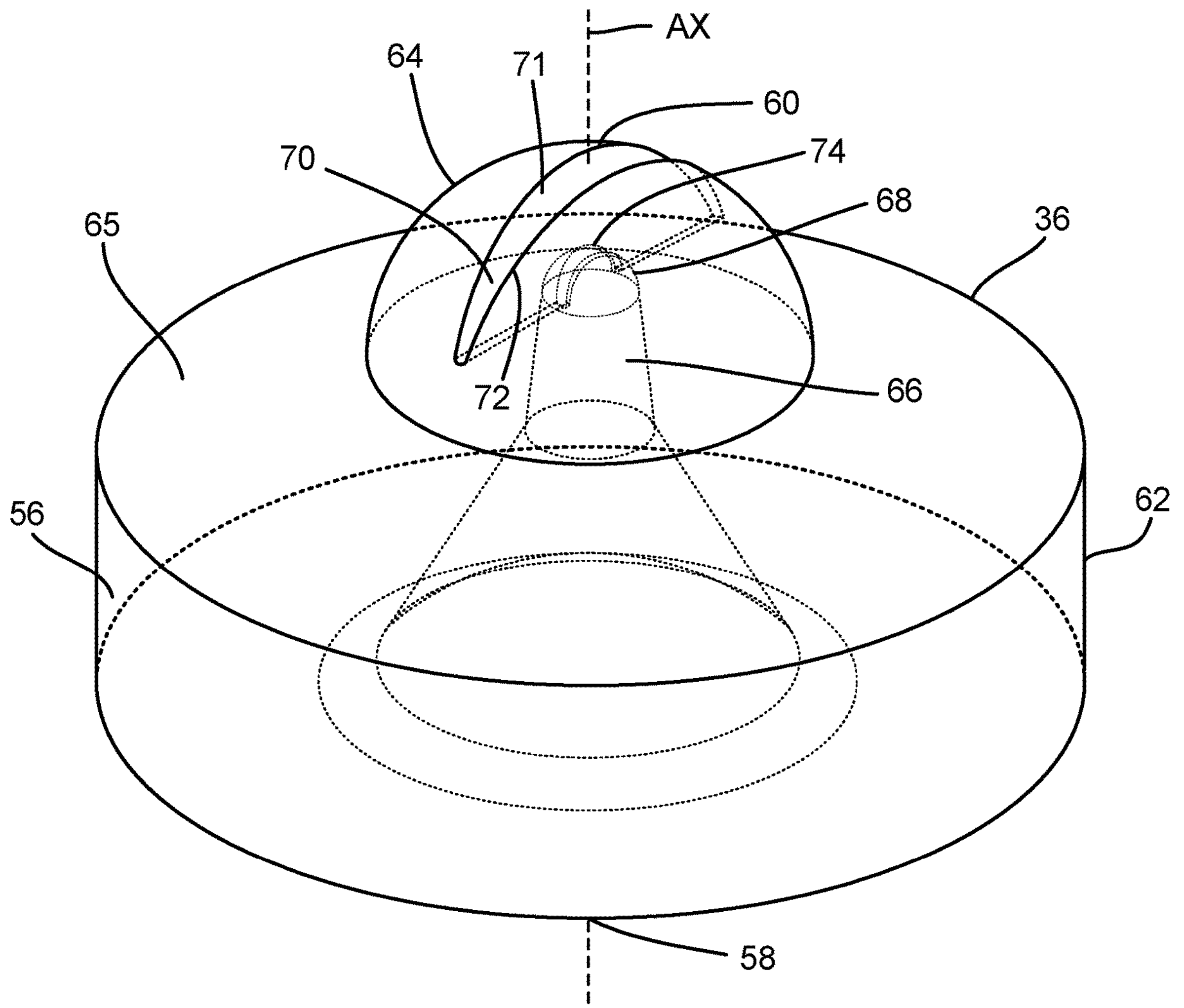
FIG. 4A is a perspective view of the tip piece from FIG. 3.
Figure 4B:
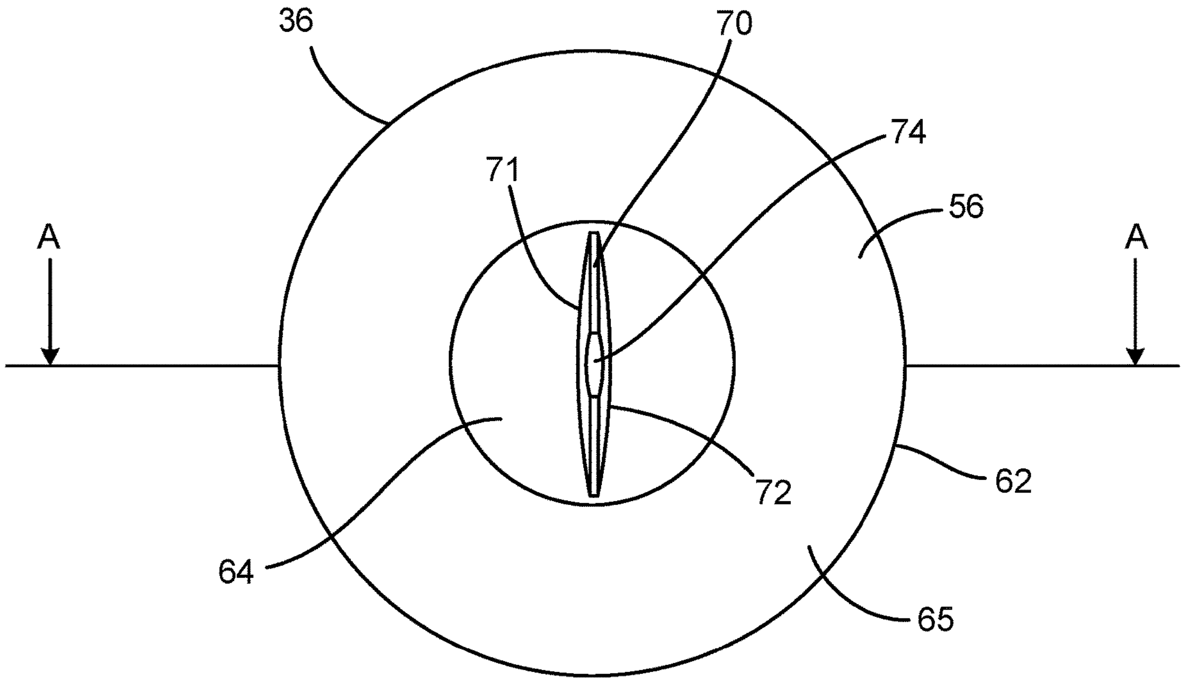
FIG. 4B is a top view of the tip piece from FIG. 4A.
Figure 4C:
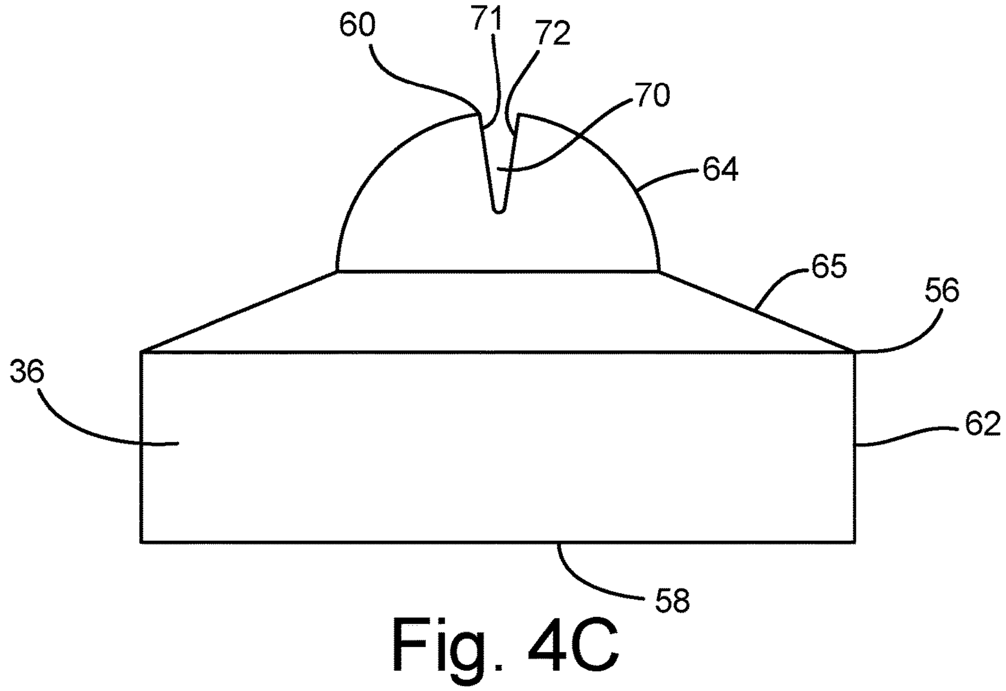
FIG. 4C is a side elevation view of the tip piece from FIG. 4B.

FIGS. 4A-4C will be discussed concurrently. FIGS. 4A-4C provide various views of tip piece 36. FIG. 4A is a perspective view of tip piece 36, FIG. 4B is a top view of tip piece 36, and FIG. 4C is a side elevation view of tip piece 36. As shown in FIGS. 4A-4C, tip piece includes tip body 56, axis AX, first end 58, second end 60, cylindrical portion 62, domed portion 64, conical portion 65, and passage 66 with terminal end 68. Tip piece 36 further includes nozzle 70, first surface 71, second surface 72, and orifice 74. Passage 66, terminal end 68, orifice 74, and portions of nozzle 70 are shown in phantom in FIG. 4A.

In the embodiment of FIGS. 4A-4C, tip body 56 extends axially along axis AX from first end 58 to second end 60. Cylindrical portion 62, domed portion 64, and conical portion 65 make up tip body 56. Cylindrical portion 62 extends axially from first end 58 to conical portion 65. Conical portion 65 extends axially from cylindrical portion 62 to domed portion 64, and domed portion 64 extends axially from conical portion 65 to second end 60. While the embodiment of tip body 56 in FIGS. 4A-4C comprises cylindrical portion 62, domed portion 64, and conical portion 65, tip body 56 can include various different geometries and is not limited to the geometry of the embodiment shown in FIGS. 4A-4C. For example, tip body 56 can include a cylindrical portion connected directly to a domed portion, or tip body 56 can include a cylindrical portion connected solely to a conical portion, or tip body 56 can be completely conical. In other embodiments, tip body 56 can be completely cylindrical.

Passage 66 extends axially inside tip body 56 from first end 58 to terminal end 68 between first end 58 and second end 60 of tip body 56. At first end 58, passage 66 forms a fluid inlet for tip piece 36. In the embodiment of FIG. 4A-4C, terminal end 68 of passage 66 is positioned within domed portion 64. Terminal end 68 of passage 66 can be hemispherical or dome shaped. In alternative embodiments, terminal end 68 can be flat, cylindrical, parabolic, elliptical, conical, and/or other embodiments.

Nozzle 70 extends axially into tip body 56 from second end 60. In the embodiment FIGS. 4A-4C, nozzle 70 is disposed entirely on domed portion 64 of tip body 56. Nozzle 70 extends axially from second end 60 and intersects terminal end 68 of passage 66 to form orifice 74. As nozzle 70 extends toward passage 66 from second end 60, nozzle 70 tapers and narrows. For example, as shown in FIGS. 4A-4C, nozzle 70 can be wedge shaped with first surface 71 opposite second surface 72. First surface 71 and second surface 72 converge toward one another as first surface 71 and second surface 72 each extends from second end 60 toward terminal end 68 of passage 66 and orifice 74. As shown best in FIG. 4C, first surface 71 and second surface 72 form a V-shaped side profile in nozzle 70.

Orifice 74, shown best in FIG. 4A, fluidically connects nozzle 70 and passage 66. Orifice 74 serves as the outlet for tip piece 36 and controls the spray pattern of the fluid exiting tip piece 36. Since orifice 74 is formed between nozzle 70 and the domed or hemispherical shaped terminal end 68 of passage 66, orifice 74 has an arch shape, with orifice 74 being widest at a peak of the arch shape, and narrowest at the ends of the arch shape, as shown in FIGS. 4A and 4B. Nozzle 70 and orifice 74 can both be formed by forming first surface 71 and second surface 72 into second end 60 of tip body 56 until first surface 71 and second surface 72 both intersect terminal end 68 of passage 66 and thereby form the arch-shaped profile of orifice 74. As discussed below with reference to FIGS. 5A and 5B, a perimeter of orifice 74 is rounded to create a smooth and rounded interface between nozzle 70 and passage 66.

Figure 5A:
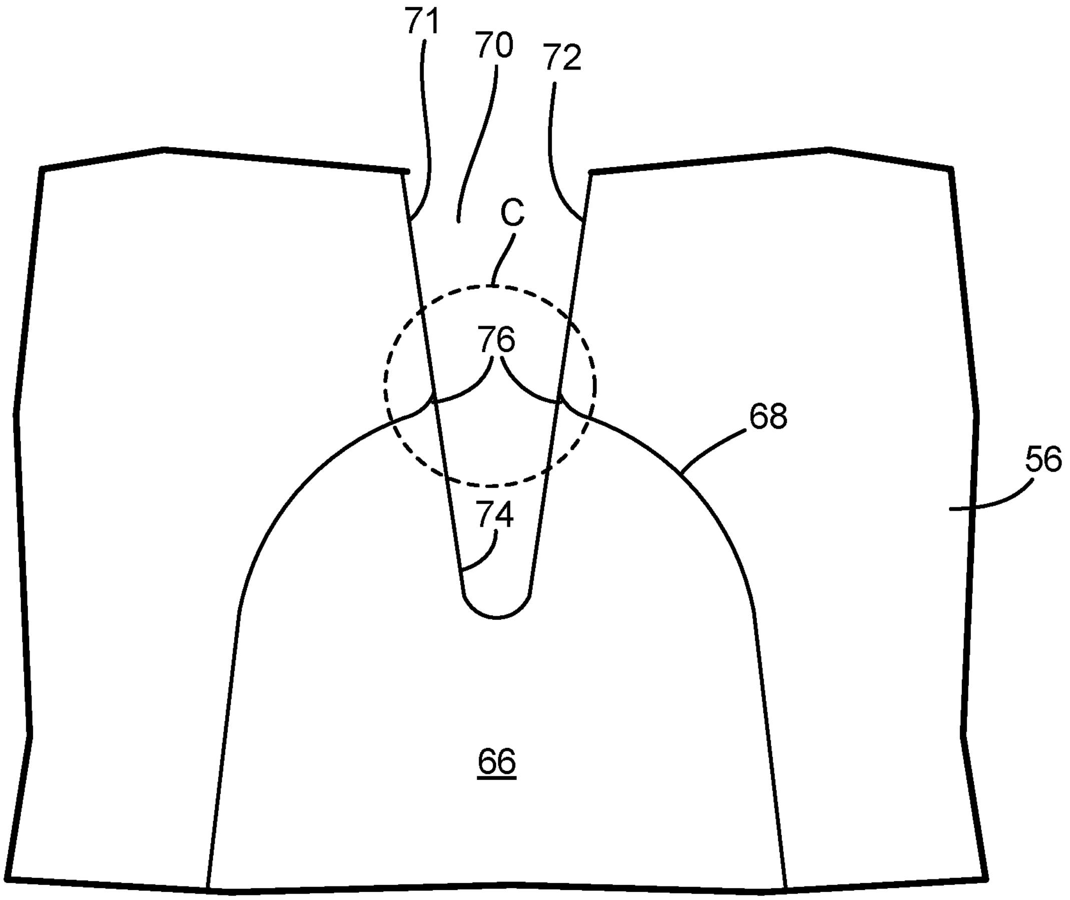
FIG. 5A is a cross-sectional view of an orifice and passage of the tip piece taken along line A-A from FIG. 4B.
Figure 5B:
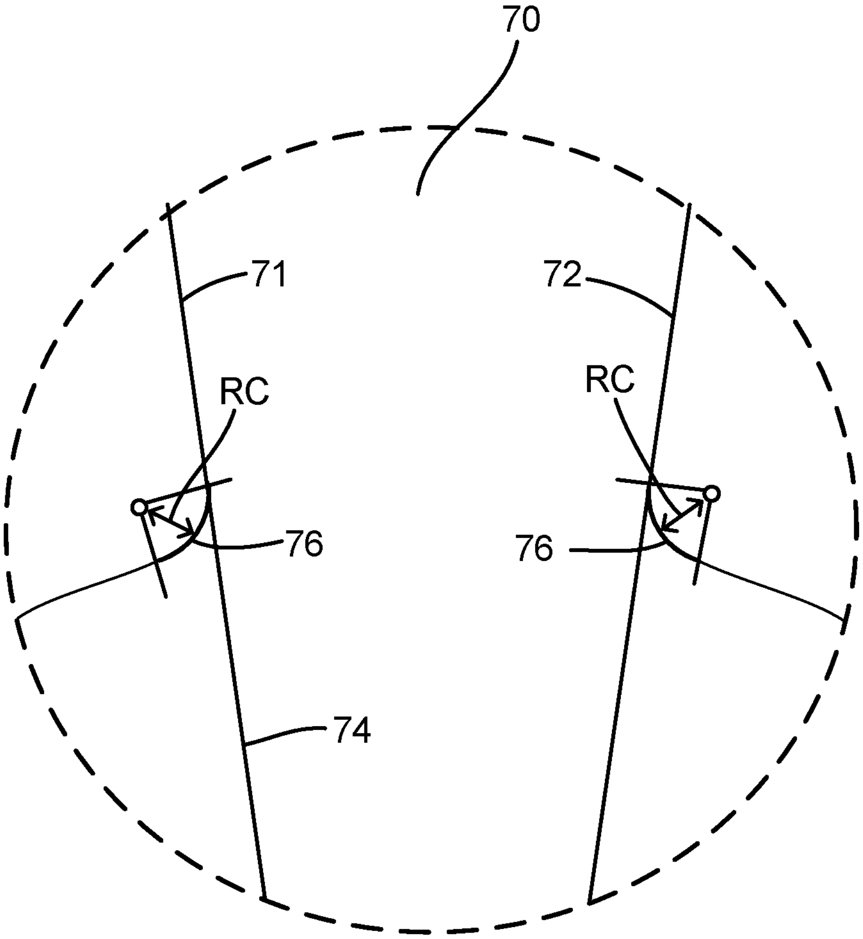
FIG. 5B is an enlarged view of the orifice and passage of the tip piece taken from circle C of FIG. 5A.

FIGS. 5A and 5B will be discussed concurrently. The embodiment shown in FIGS. 5A and 5B is taken directly from the embodiment of FIGS. 4A and 4B. FIG. 5A is a cross-sectional view of nozzle 70, orifice 74, and terminal end 68 of passage 66 taken along line A-A from FIG. 4B. FIG. 5B is an enlarged view of orifice 74 taken from circle C of FIG. 5A. As shown in FIGS. 5A and 5B, orifice 74 includes rounded interface 76 with a radius of curvature RC. Rounded interface 76 is formed on a perimeter of orifice 74 and extends between passage 66 and nozzle 70. Rounded interface 76 connects first surface 71 and second surface 72 with the domed-shape surface of terminal end 68 of passage 66 and creates a relatively smooth transition across orifice 74 between passage 66 and nozzle 70. For example, rounded interface 76 can have a radius of curvature in the range of 0.0005 inches (0.0127 millimeters) to 0.005 inches (0.1270 millimeters). The smooth transition created by rounded interface 76 at orifice 74 eliminates sharp edges between passage 66 and nozzle 70 that may be prone to erosion during use of tip piece 36. Reducing erosion in tip piece 36 allows tip piece 36 to provide a more consistent spray pattern throughout the service life of tip piece 36.

Rounded interface 76 can be formed after orifice 74 is formed by flowing a particle laden fluid through passage 66 and out of orifice 74. In other embodiments, rounded interface 76 can be formed on orifice 74 via electrical discharge machining (EDM) or by laser cutting. To accommodate the formation of rounded interface 76, orifice 74 can be formed first at a smaller dimension, then expanded in size as rounded interface 76 is formed on the perimeter of orifice 74. Rounded interface 76 can also be formed at the same time as orifice 74. For example, tip piece 36 can be manufactured by packing metal particles into a preform (such as tungsten carbide) and sintering the metal particles into tip piece 36. In this example, rounded interface 76 and orifice 74 are both included in the shape of the preform prior to sintering. In another example, tip piece 36 can be formed via additive manufacturing, with rounded interface 76 and orifice 74 being formed in tip piece 36 during the additive manufacturing process. While tip piece 36 has been discussed above as being used in spray tip 34 for spray gun 22 (shown in FIGS. 1-2B), tip piece 36 with rounded interface 76 can be used spray tips for other systems, as discussed below with reference to FIGS. 6A and 6B.

Figure 6A:
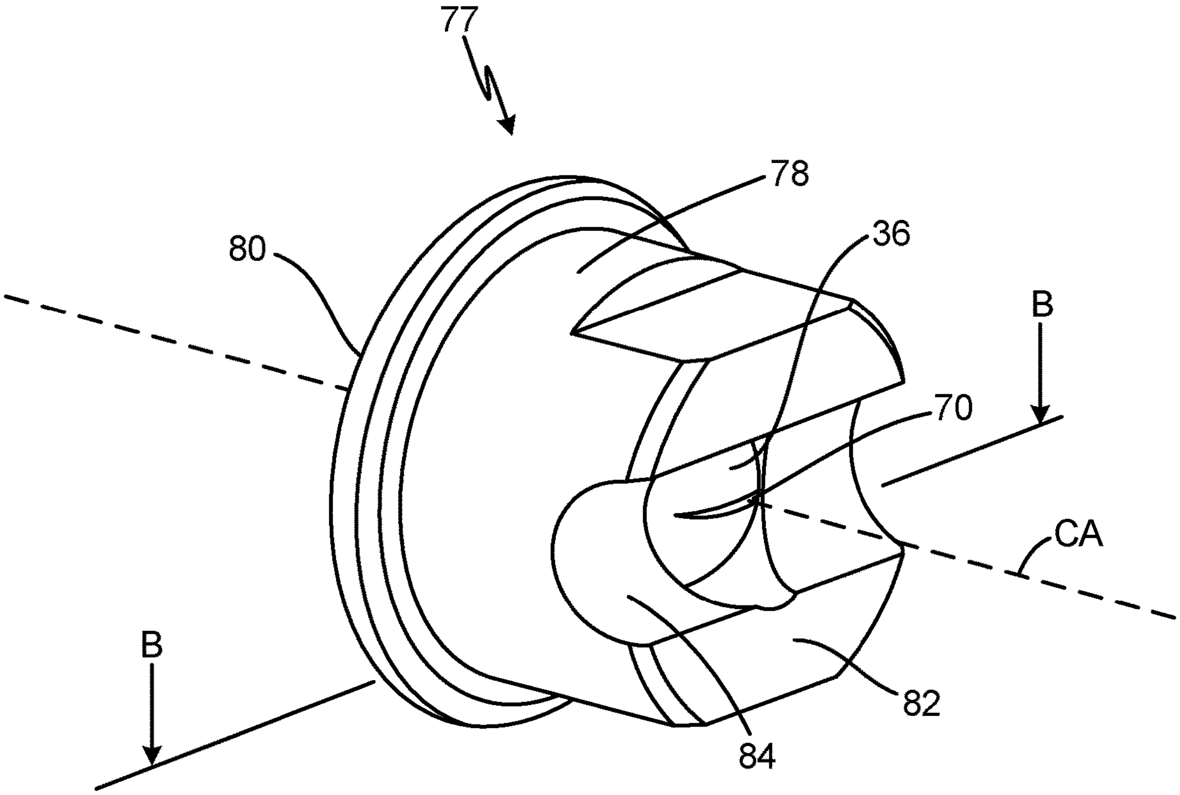
FIG. 6A is a perspective view of a flat tip.
Figure 6B:
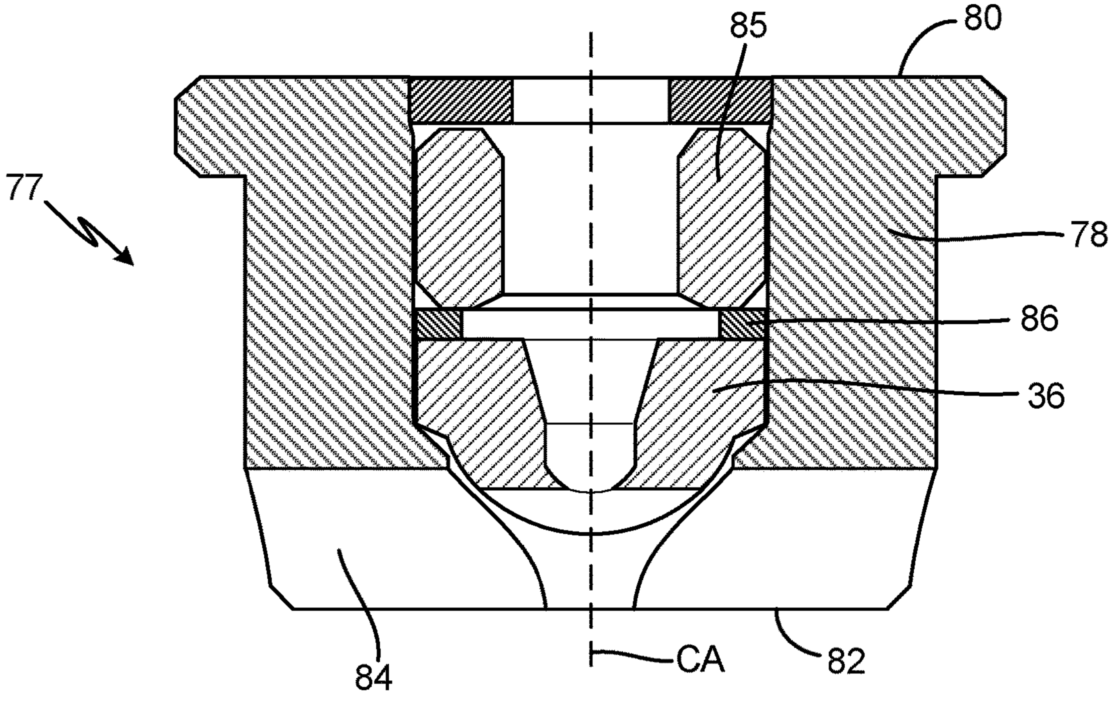
FIG. 6B is a cross-section view of the flat tip taken along line B-B from FIG. 6A.

FIGS. 6A and 6B will be discussed concurrently. FIG. 6A is a perspective view tip piece 36 assembled into flat spray tip 77. FIG. 6B is a cross-section view of flat tip 77 taken along line B-B from FIG. 6A. Flat spray tip 77 is used in automated spraying systems. As shown in FIGS. 6A and 6B, flat spray tip 77 includes a body 78 extending axially between first end 80 and second end 82. Body 78 of flat spray tip 77 includes a through-bore extending axially through body 78 and sized to receive tip piece 36. Tip piece 36 is inserted into the through-bore of body 78 and is coaxial with body 78 of flat spray tip 77. Washer 86 and fastener 85 are inserted into through-bore 78 after tip piece 36 to fasten tip piece 36 within flat spray tip 77. Channel 84 is formed on second end 82 of flat spray tip 77 so that flat spray tip 77 does not restrict or interfere with nozzle 70 of tip piece 36.

Figure 7:
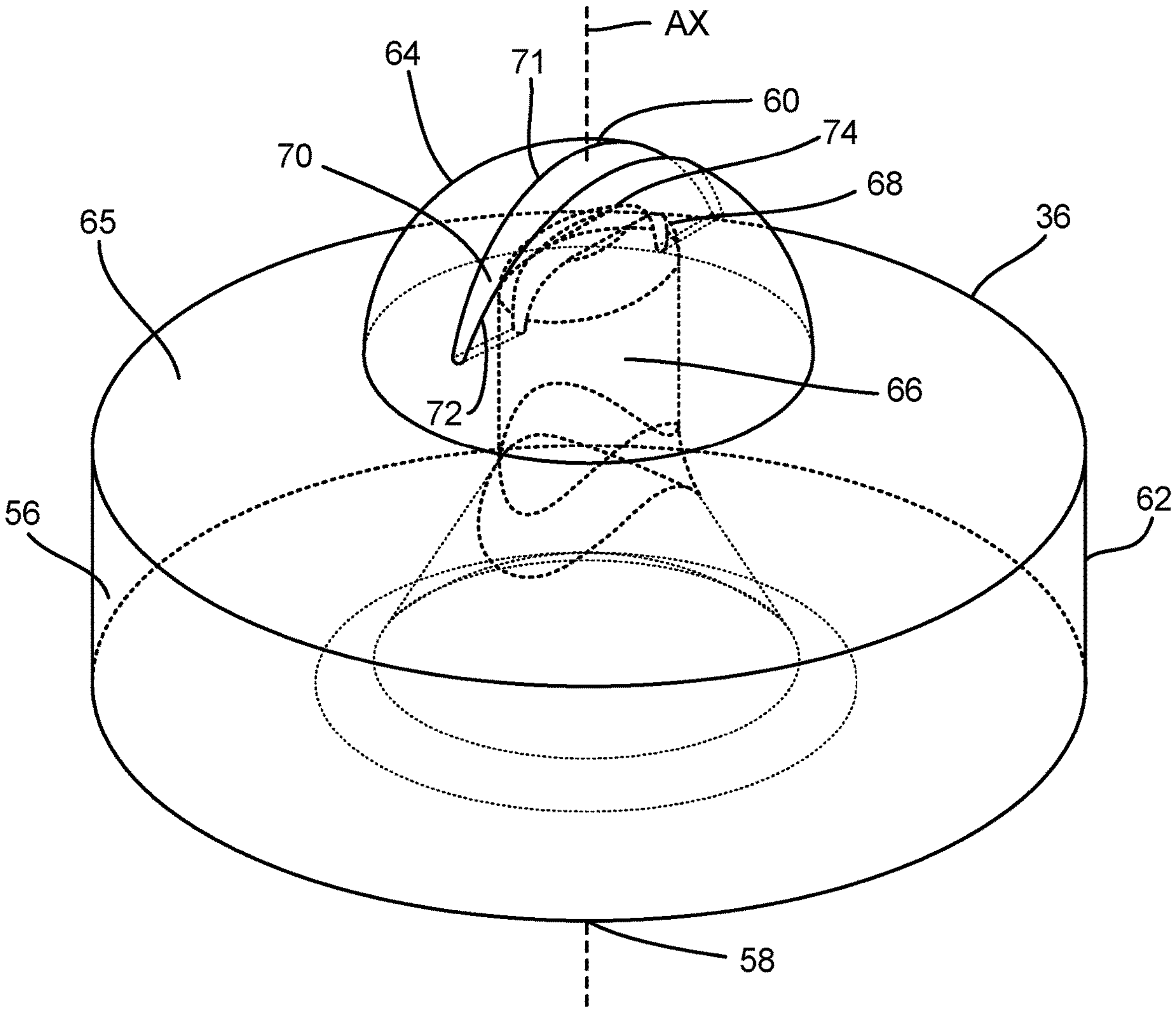
FIG. 7 is a perspective view of another embodiment of the tip piece.

FIGS. 7-13 disclosure additional embodiments of tip piece 36. FIG. 7 is a perspective view of tip piece 36 with terminal end 68 of passage 66 having an elliptical shape. In the embodiment of FIG. 7, orifice 74 is formed in the elliptically-shaped terminal end 68 in similar fashion to the embodiment of FIGS. 4A and 4B. Rounded interface 76 (shown in FIGS. 5A and 5B) can also be formed on the perimeter of orifice 74 in the embodiment of FIG. 7 in similar manner as previously discussed.

Figure 8:
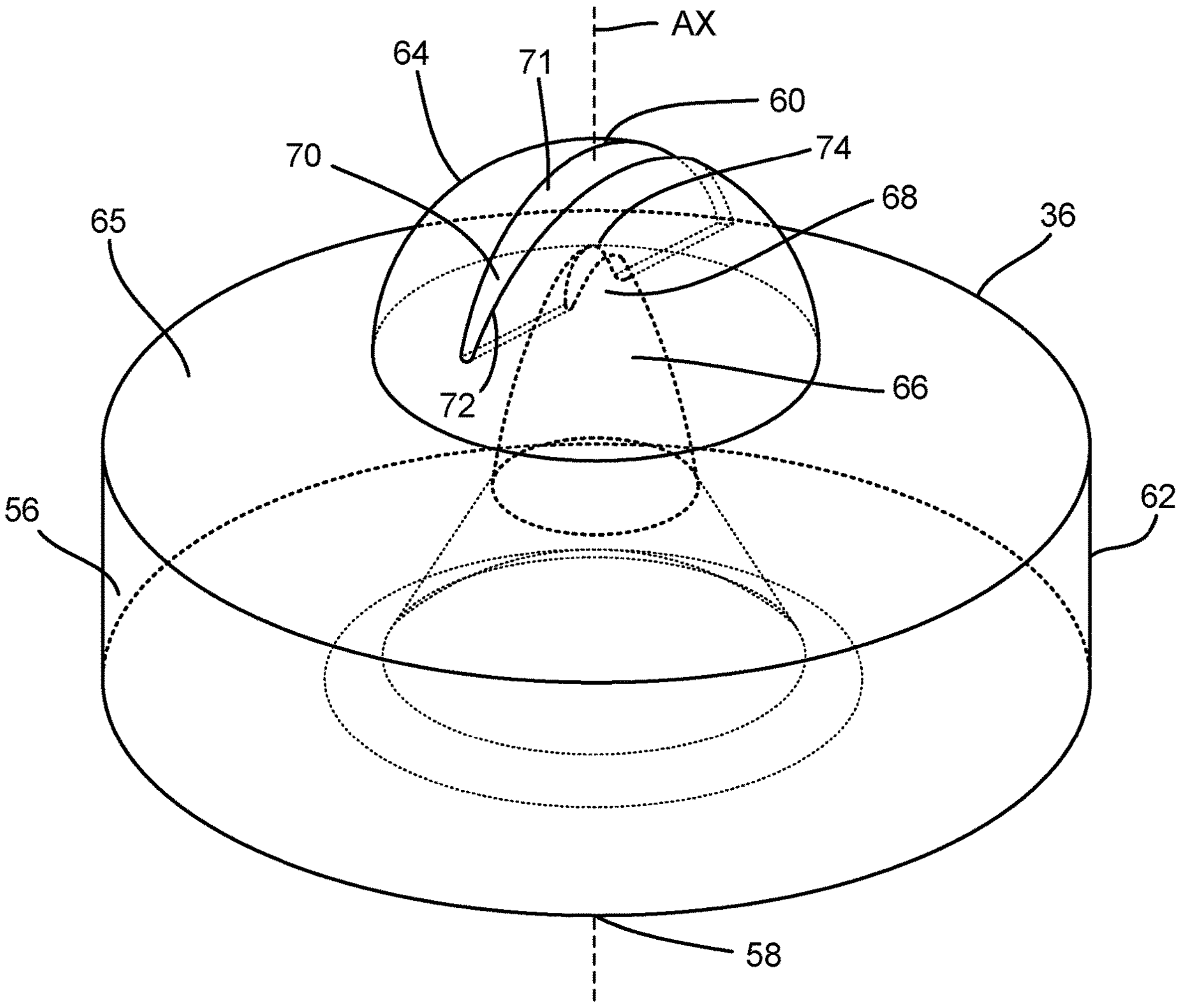
FIG. 8 is a perspective view of another embodiment of the tip piece.

FIG. 8 is a perspective view of tip piece 36 with terminal end 68 of passage 66 having a parabolic shape. In the embodiment of FIG. 8, orifice 74 is formed in the parabolically-shaped terminal end 68 in similar fashion to the embodiment of FIGS. 4A and 4B. Rounded interface 76 (shown in FIGS. 5A and 5B) can also be formed on the perimeter of orifice 74 in the embodiment of FIG. 8 in similar manner as previously discussed.

Figure 9:
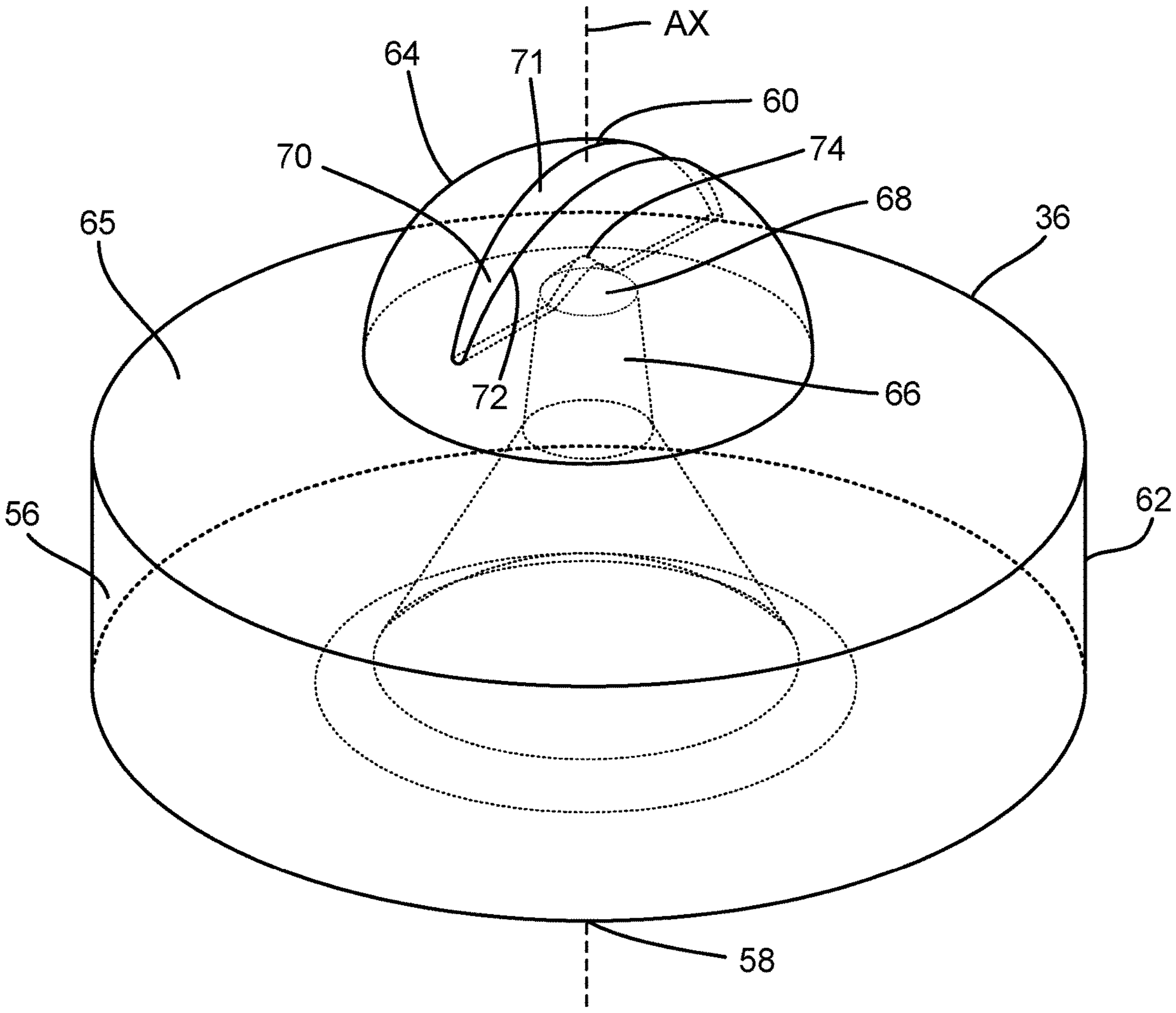
FIG. 9 is a perspective view of another embodiment of the tip piece.

FIG. 9 is a perspective view of tip piece 36 with terminal end 68 of passage 66 having a conical shape. In the embodiment of FIG. 9, orifice 74 is formed in the conically-shaped terminal end 68 in similar fashion to the embodiment of FIGS. 4A and 4B. Rounded interface 76 (shown in FIGS. 5A and 5B) can also be formed on the perimeter of orifice 74 in the embodiment of FIG. 9 in similar manner as previously discussed.

Figure 10:
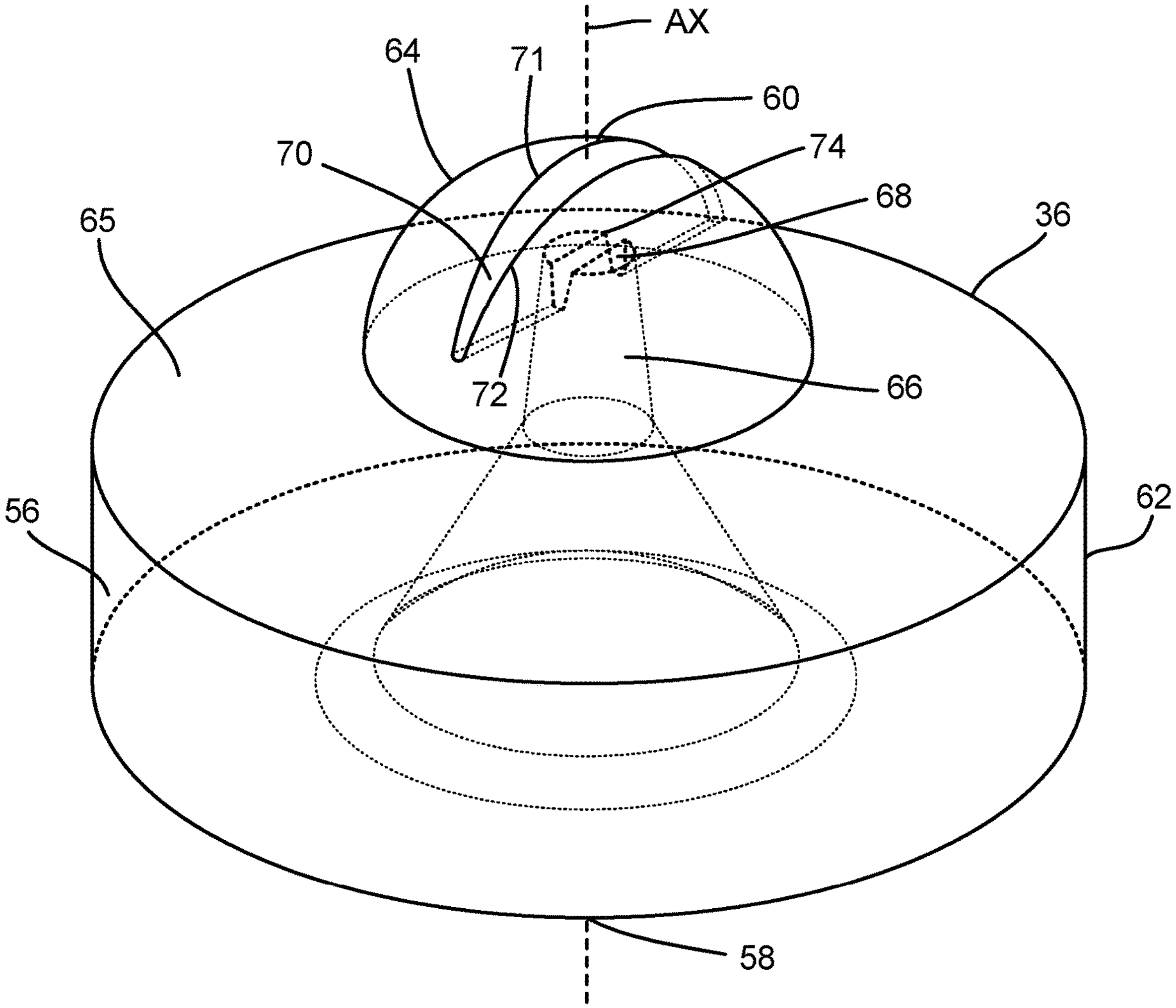
FIG. 10 is a perspective view of another embodiment of the tip piece.

FIG. 10 is a perspective view of tip piece 36 with terminal end 68 of passage 66 having a flat cylindrical shape. In the embodiment of FIG. 10, orifice 74 is formed in the flat-cylindrically-shaped terminal end 68 in similar fashion to the embodiment of FIGS. 4A and 4B. Rounded interface 76 (shown in FIGS. 5A and 5B) can also be formed on the perimeter of orifice 74 in the embodiment of FIG. 10 in similar manner as previously discussed.

Figure 11:
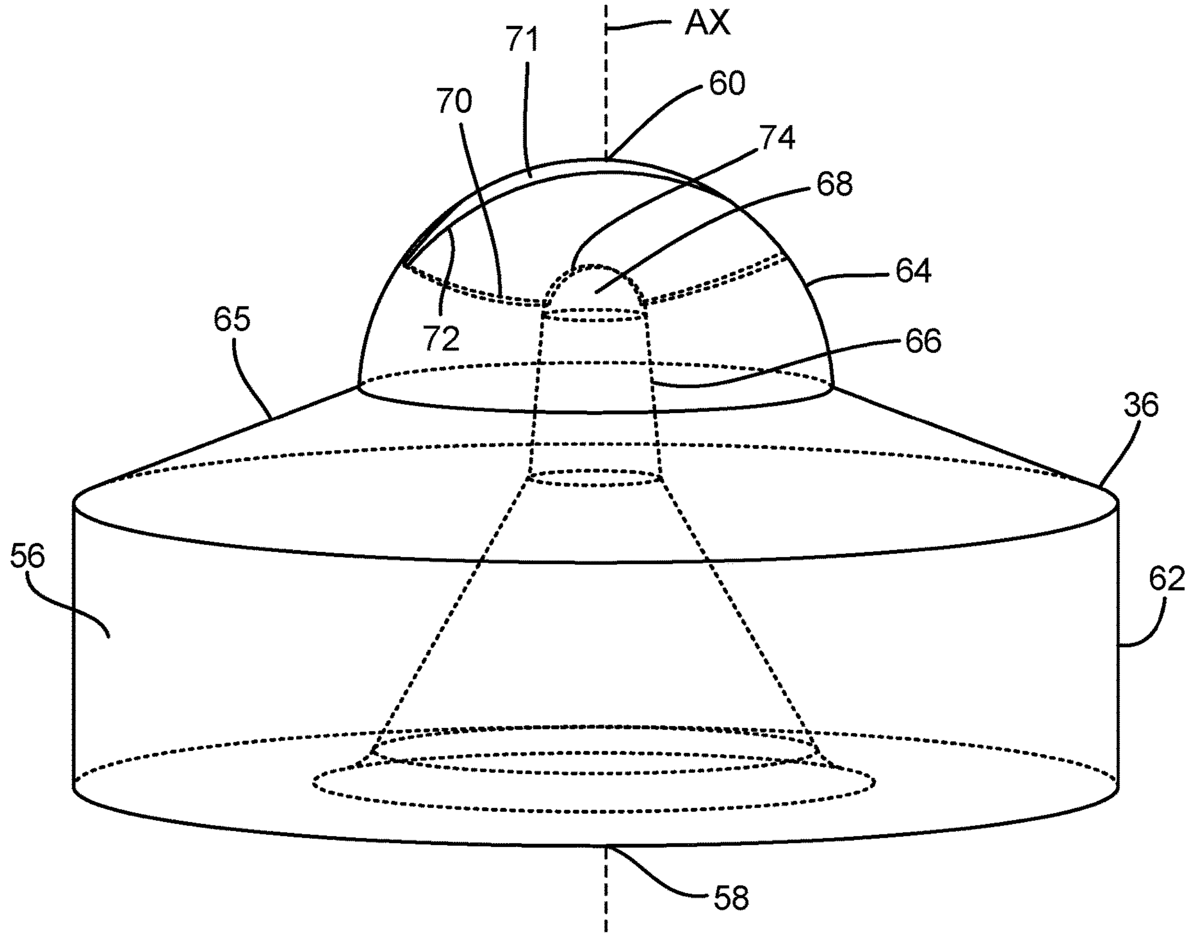
FIG. 11 is a side elevation view of another embodiment of the tip piece.

FIG. 11 is a side elevation view of tip piece 36 with nozzle 70 arching into terminal end 68 of passage 66. In the embodiment of FIG. 11, nozzle 70 can be formed by performing a plunge cut into second end 60 with a grinding wheel (not shown) until the grinding wheel cuts into terminal end 68 of passage 66 to form orifice 74.

Figure 12:
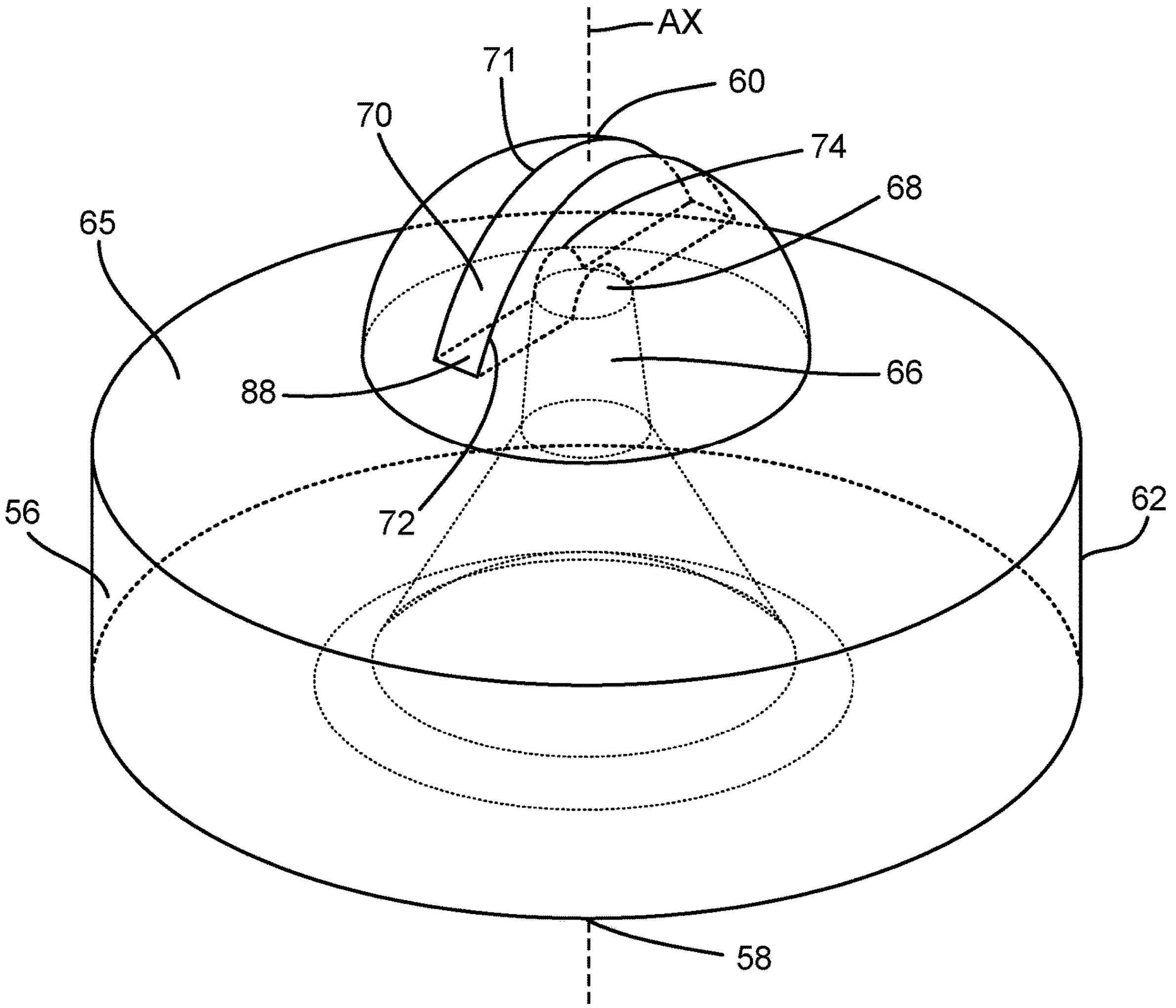
FIG. 12 is a perspective view of another embodiment of the tip piece.

FIG. 12 is a perspective view of tip piece 36 with nozzle 70 a straight non-tapering profile. In the embodiment of FIG. 12, nozzle 70 extends axially into tip body 56 from second end 60. Nozzle 70 is disposed entirely on domed portion 64 of tip body 56. Nozzle 70 extends axially from second end 60 and intersects terminal end 68 of passage 66 to form orifice 74. As nozzle 70 extends toward passage 66 from second end 60, nozzle 70 maintains a constant spacing between first surface 71 and second surface 72. Bottom surface 88 of nozzle 70 is formed between first surface 71 and second surface 72 and spaces first surface 71 apart from second surface 72. First surface 71 and second surface 72 are parallel to each other.

Figure 13:
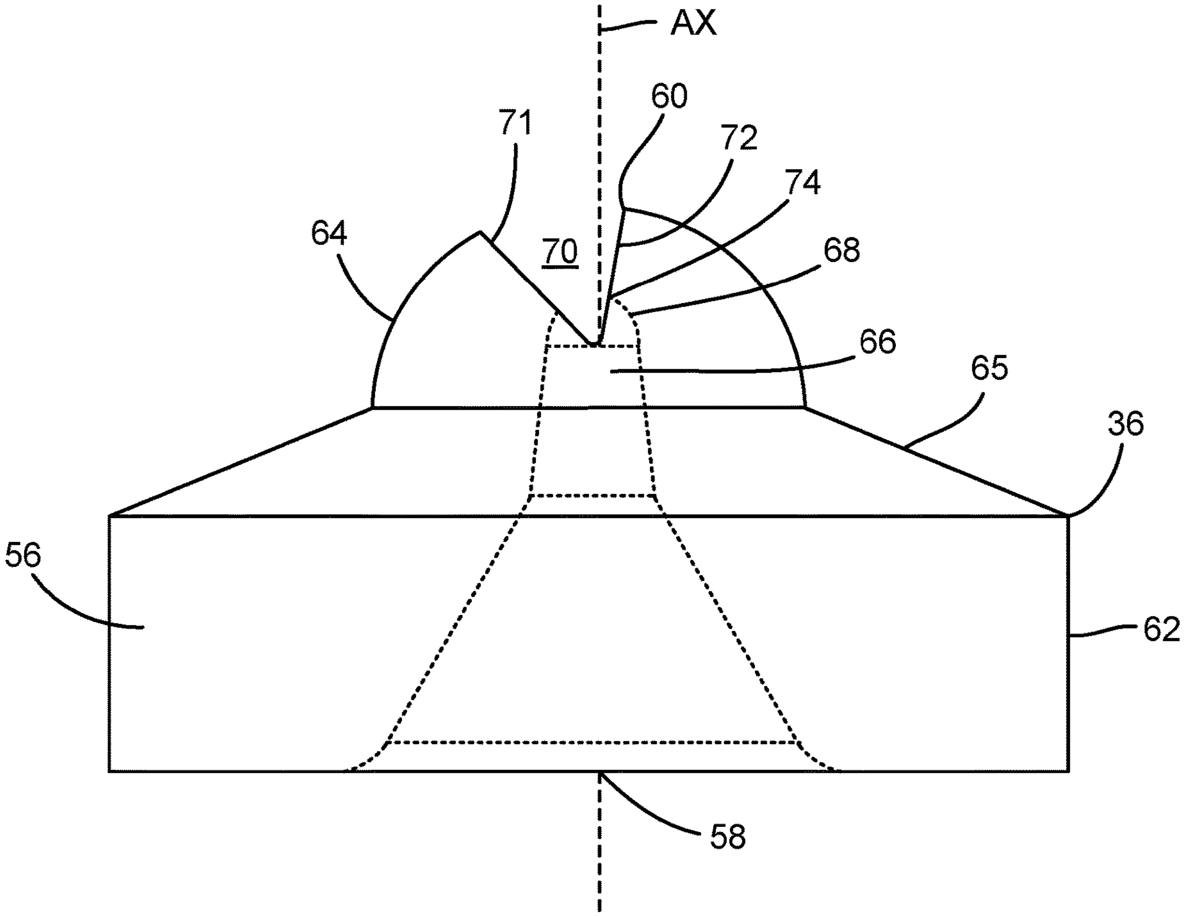
FIG. 13 is a side elevation view of another embodiment of the tip piece.

FIG. 13 is a side elevation view of tip piece 36 with another embodiment of nozzle 70 that is different from the embodiments of FIGS. 4A, 4B, and 12. In the embodiment of FIG. 13, first surface 71 and second surface 72 form a V-shaped side profile in nozzle 70. However, first surface 71 extends at a larger angle relative axis AX than second surface 72, such that the V-shaped side profile of nozzle 70 is canted relative axis AX of tip piece 36.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A tip piece for a sprayer comprising:

a tip body extending axially between a first end and a second end along an axis, wherein the tip body comprises a cylindrical portion with a flat surface at the first end;

a passage extending axially inside the tip body from the flat surface at the first end to a terminal end between the first end and the second end of the tip body;

a nozzle extending axially into the tip body from the second end of the tip body, wherein the nozzle is wedge shaped with a first surface opposite a second surface, and wherein the first surface and the second surface converge toward one another as the first surface and the second surface extend from the second end of the tip body toward the passage;

an orifice between the nozzle and the passage, wherein the passage is on the axis from the first end to the orifice; and a rounded interface between the terminal end of the passage and the first surface and the second surface, the rounded interface extending around the orifice to form a perimeter of the orifice, wherein the rounded interface comprises a radius of curvature, wherein the rounded interface is a surface that curves through the orifice from an inside surface of the terminal end of the passage onto both the first surface and the second surface, and wherein the radius of curvature is in the range of 0.0005 inches (0.0127 millimeters) to 0.005 inches (0.1270 millimeters).

2. The tip piece of claim 1, wherein the terminal end of the passage is dome shaped, flat, cylindrical, parabolic, elliptical, and/or conical.

3. The tip piece of claim 2, wherein the orifice comprises an arch shape.

4. A reversible spray tip for a sprayer comprising:

a cylindrical body extending along a center axis of the reversible spray tip a tip handle connected to an end of the cylindrical body;

a bore extending transversely through the cylindrical body relative to the center axis;

a retainer inside the bore; and a tip piece inside the bore, wherein the tip piece comprises:

a tip body extending along an axis between a first end and a second end, wherein the axis is transverse with the center axis, and wherein the first end comprises an end surface facing toward the retainer;

a passage extending along the axis inside the tip body from the end surface at the first end to a terminal end between the first end and the second end of the tip body, wherein the passage is unobstructed on the axis from the first end to the terminal end;

a nozzle extending into the tip body from the second end of the tip body, wherein the nozzle intersects the terminal end of the passage to form an orifice, and wherein the nozzle is wedge shaped with a first surface opposite a second surface, and wherein the first surface and the second surface converge toward one another as the first surface and the second surface extend from the first end of the tip body toward the orifice and passage; and a rounded interface that is a curved surface formed on a perimeter of the orifice between the nozzle and the terminal end of the passage, and wherein the rounded interface curves through the orifice from inside the terminal end of the passage out onto the first surface and out onto the second surface to connect the first surface and the second surface with the terminal end of the passage, and wherein the rounded interface has a radius of curvature of at least 0.0005 inches (0.0127 millimeters).

5. The reversible spray tip of claim 4, wherein the nozzle tapers and narrows as the nozzle extends toward the terminal end.

6. The reversible spray tip of claim 4, wherein the terminal end of the passage is hemispherical, flat, cylindrical, parabolic, elliptical, and/or conical.

7. The reversible spray tip of claim 6, wherein the orifice comprises an arch shape.

8. A method for forming a tip piece for a sprayer, the method comprising:

forming a tip body with a first end and a second end;

forming a flat end surface at the first end;

forming a passage that extends into the first end of the tip body from the flat end surface;

forming a nozzle into the second end of the tip body, wherein the nozzle intersects the passage to form an orifice between the passage and the nozzle, wherein the passage is straight from the first end of the tip body to the orifice;

forming the nozzle to comprise a tapering wedge shaped profile with a first surface opposite a second surface, and wherein the first surface and the second surface converge toward one another as the first surface and the second surface extend from the first end of the tip body toward the orifice and passage; and rounding a perimeter of the orifice to form a rounded interface between the passage and the nozzle, wherein the rounded interface is a curved surface that curves from an inside surface of the passage out onto the first surface and out onto the second surface through the orifice to connect the first surface and the second surface with the passage, and wherein the rounded interface is rounded to form a radius of curvature in the range of 0.0005 inches (0.0127 millimeters) to 0.005 inches (0.1270 millimeters) on the rounded interface.

9. The method of claim 8, further comprises:

forming a dome shaped surface, a flat surface, a cylindrical surface, a parabolic surface, an elliptical surface, and/or a conical surface in a terminal end of the passage between the first end and the second end of the tip body.

10. The method of claim 8, further comprises:

forming the orifice into the second end of the tip body, wherein the orifice comprises an arch-shaped profile.

11. A tip piece for a sprayer comprising:

a tip body extending axially between a first end and a second end;

a passage extending axially inside the tip body from the first end to a terminal end between the first end and the second end of the tip body;

a nozzle extending axially into the tip body from the second end of the tip body, wherein the nozzle is wedge shaped with a first surface opposite a second surface, and wherein the first surface and the second surface converge toward one another as the first surface and the second surface extend from the second end of the tip body toward the passage;

an orifice between the nozzle and the passage; and a rounded surface between the terminal end of the passage and the first surface and the second surface, wherein the rounded surface curves through the orifice from an inside surface of the terminal end of the passage onto both the first surface and the second surface; and wherein the rounded surface has a radius of curvature no greater than 0.005 inches (0.1270 millimeters).

* * * * *